(12) United States Patent
Meyer

(10) Patent No.: US 8,037,636 B2
(45) Date of Patent: Oct. 18, 2011

(54) BOTTOM SNAGGING SINKER

(76) Inventor: Nicholas C. Meyer, Corpus Christi, TX (US)

( * ) Notice: Subject to any disclaimer, the term of this patent is extended or adjusted under 35 U.S.C. 154(b) by 137 days.

(21) Appl. No.: 12/455,501

(22) Filed: Jun. 3, 2009

(65) Prior Publication Data
US 2009/0300965 A1  Dec. 10, 2009

Related U.S. Application Data

(60) Provisional application No. 61/130,974, filed on Jun. 5, 2008.

(51) Int. Cl.
A01K 95/00 (2006.01)
(52) U.S. Cl. ...................................... 43/44.96; 43/44.97
(58) Field of Classification Search ................. 43/42.39, 43/42.4, 44.96, 44.97
See application file for complete search history.

(56) References Cited

U.S. PATENT DOCUMENTS

| | | | | |
|---|---|---|---|---|
| 1,110,507 A | * | 9/1914 | Myers | 102/366 |
| 1,313,567 A | * | 8/1919 | Ulrich | 43/42.16 |
| 1,339,697 A | * | 5/1920 | England | 43/44.96 |
| 1,453,177 A | * | 4/1923 | Peterson | 114/302 |
| 1,583,795 A | * | 5/1926 | Pasturzak | 43/44.96 |
| 1,776,967 A | * | 9/1930 | Eckart | 43/44.96 |
| 1,810,565 A | * | 6/1931 | Kenely | 43/44.96 |
| 2,037,232 A | * | 4/1936 | Hendriks | 43/44.96 |
| 2,292,517 A | * | 8/1942 | Greene | 43/42.39 |
| 2,725,842 A | * | 12/1955 | Norris et al. | 114/305 |
| 2,763,090 A | * | 9/1956 | Tadlock | 43/44.97 |
| 2,770,909 A | * | 11/1956 | Illgner | 43/43.14 |
| 2,841,916 A | * | 7/1958 | Ueda | 43/44.96 |
| 2,980,050 A | * | 4/1961 | Murray | 114/298 |
| 3,396,484 A | * | 8/1968 | Hess | 43/42.13 |
| 3,466,788 A | * | 9/1969 | Potter | 43/44.96 |
| 3,664,054 A | * | 5/1972 | Pickering | 43/19 |
| 3,735,523 A | * | 5/1973 | Merrill | 43/44.96 |
| 4,019,275 A | * | 4/1977 | Ruppe | 43/44.96 |
| 4,528,771 A | * | 7/1985 | Rea, Jr. | 43/44.9 |
| 4,848,018 A | * | 7/1989 | Clarke | 43/43.12 |
| 5,713,298 A | * | 2/1998 | Geuy et al. | 114/298 |

FOREIGN PATENT DOCUMENTS

| | | | |
|---|---|---|---|
| GB | 2032232 | * | 5/1980 |
| GB | 2203 621 | | 10/1988 |
| GB | 2252 484 | | 8/1992 |
| GB | 2418 121 | | 3/2006 |

* cited by examiner

Primary Examiner — David Parsley
(74) Attorney, Agent, or Firm — G. Turner Moller

(57) ABSTRACT

A bottom snagging sinker kit includes a retaining ring, a series of anchor wires and a nose. Rather than manufacture a wide range of specially designed sinkers having weights of different size, a bottom snagging sinker is assembled from the kit by using a standard sinker weight of the type having a passage therethrough. A fisherman or other person may assemble the sinker by connecting the retaining ring to the sinker weight with a connector, such as a cotter pin. The anchor wires are assembled to the nose or between the nose and the retaining ring. The nose is then attached to the retaining ring. When the sinker is cast into water, the sinker descends to the bottom where the anchor wires are aimed generally at the fisherman to minimize movement of the sinker. When the fisherman pulls on the fishing line, the anchor wires deflect to a position allowing easy retrieval of the sinker.

20 Claims, 4 Drawing Sheets

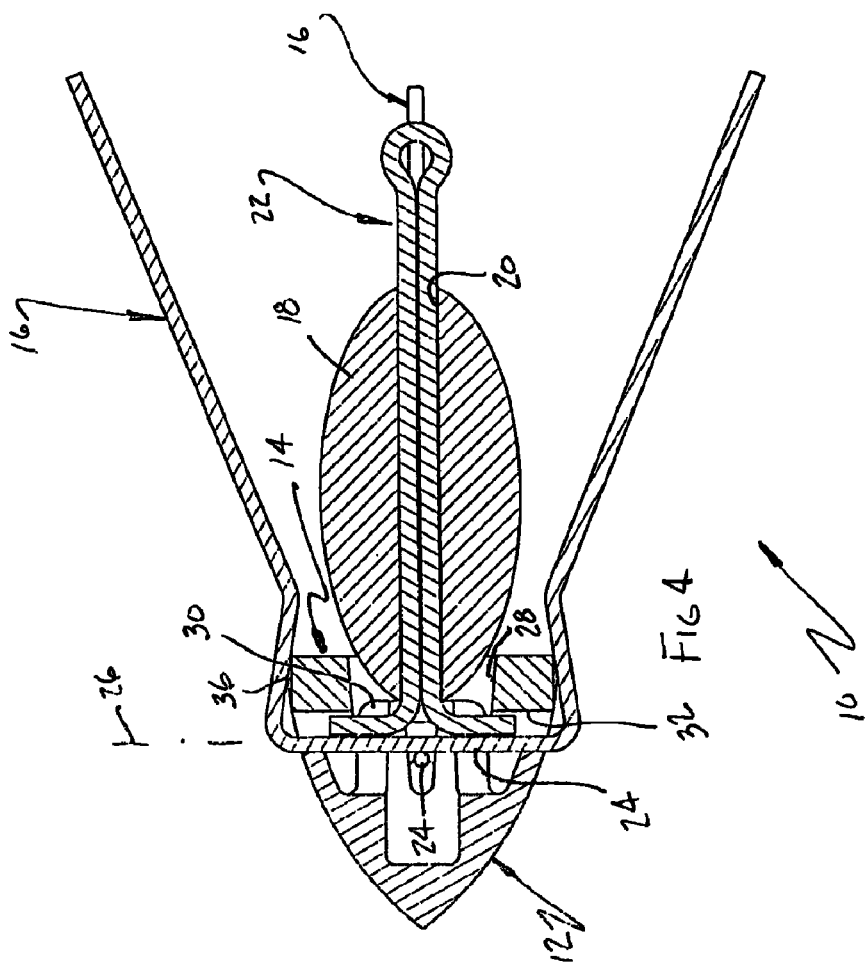
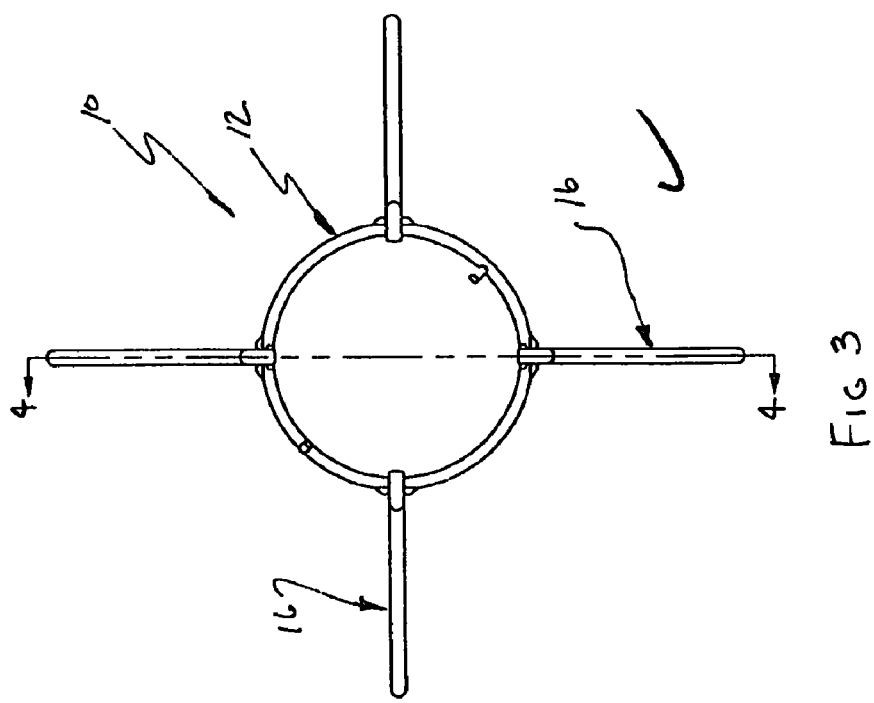

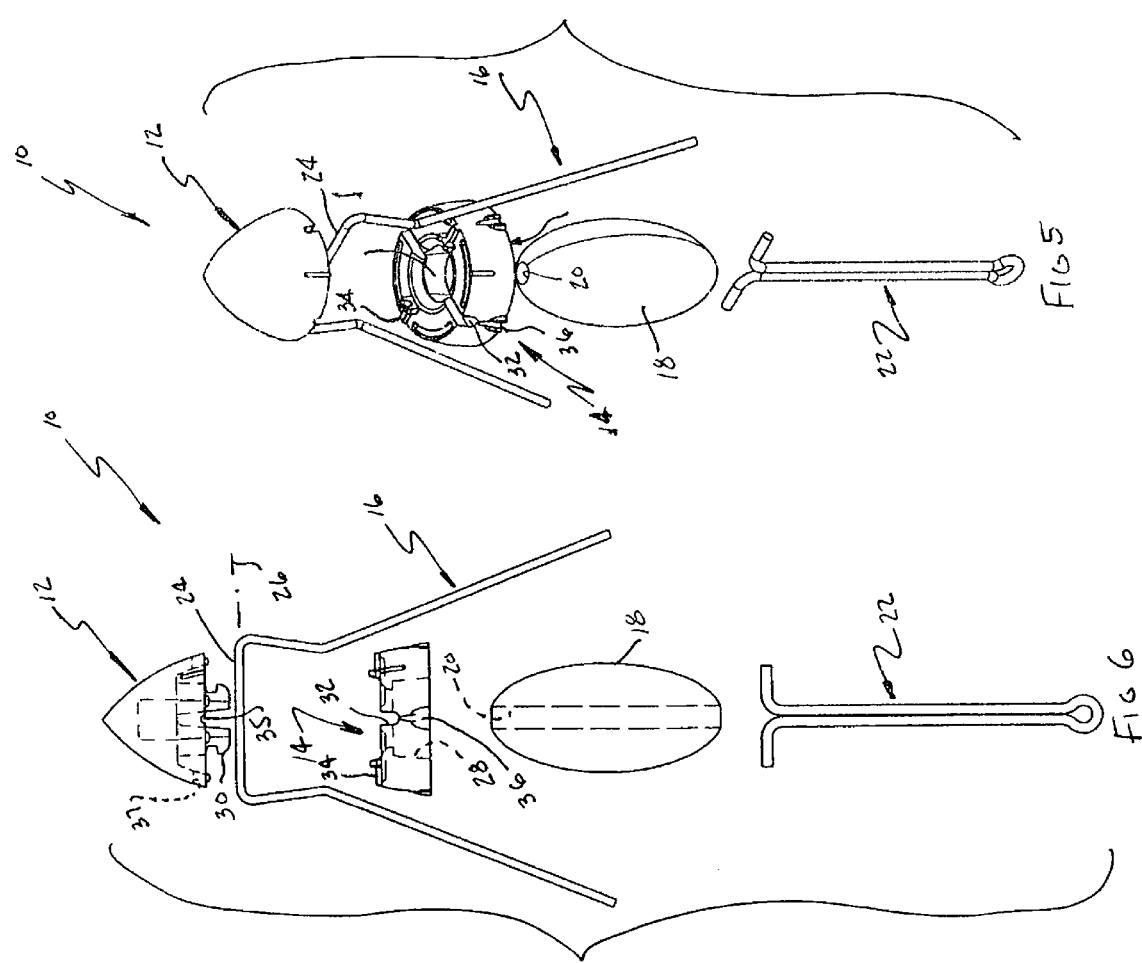

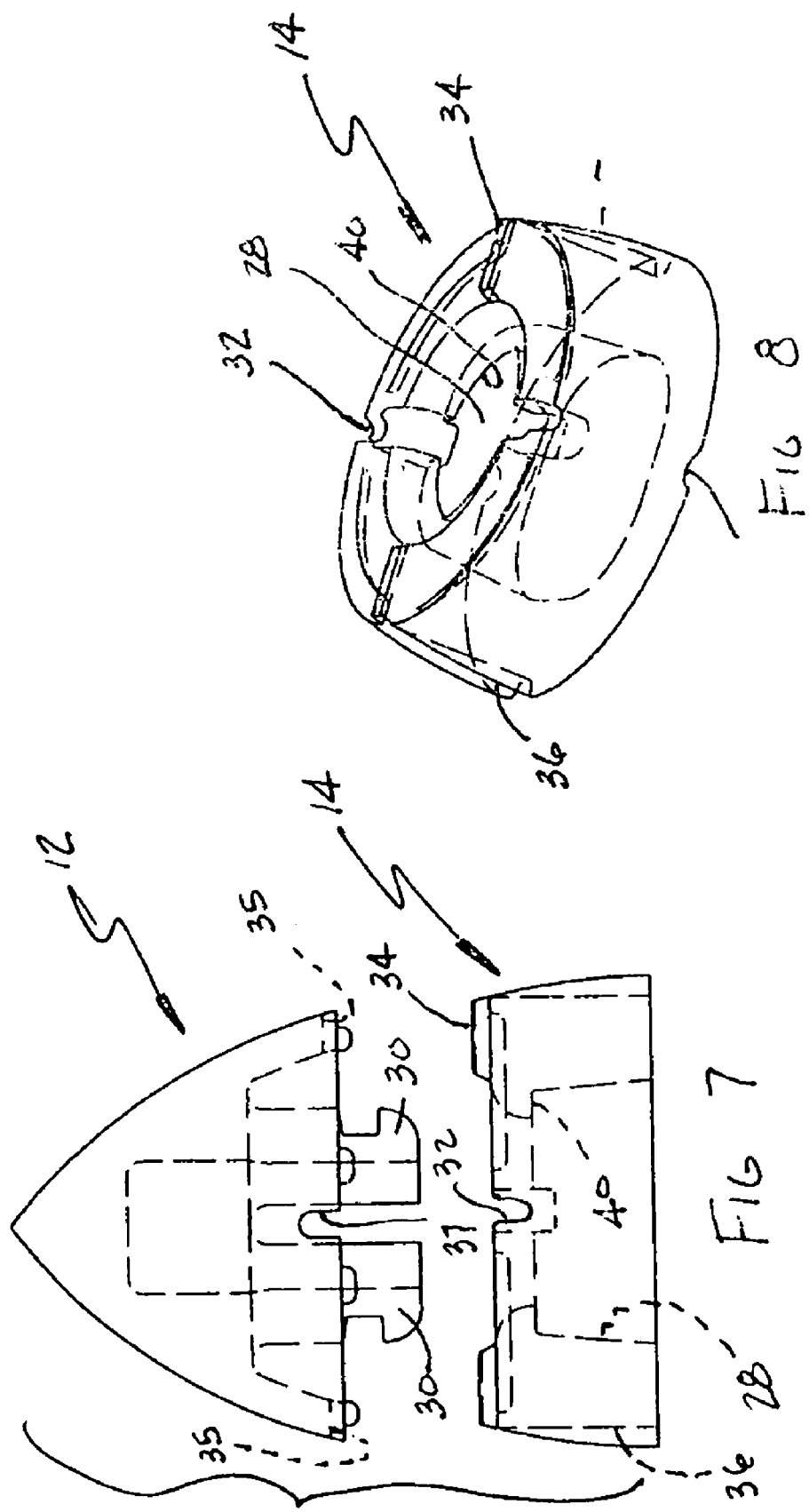

BOTTOM SNAGGING SINKER

This application is based on Provisional Patent Application Ser. No. 61/130,974, filed Jun. 5, 2008 on which priority is claimed.

This invention relates to an improved sinker used by fishermen to place a baited hook or lure on the bottom of a body of water and hold it in a desired place.

BACKGROUND OF THE INVENTION

Bottom snagging sinkers are old and well known in the art and comprise a lead weight, a nose cone and several sets of wires that embed in mud or sand at the bottom of a body of water. A leader attaches to the sinker and carries one or more baited hooks or lures. When the fisherman desires to retrieve the fishing rig, he applies enough force to free the anchor wires from the bottom.

There are two types of wired sinkers, one with fixed wires that have to be released from the bottom by straightening the wires as exemplified by Great Britain Patent 2,252,484 or the newer version which has rotating wires clipped into slots as exemplified by Great Britain Patents 2,203,621; 2,242,602; and 2,418,121. When tension is applied to the fishing line, the wires bend or rotate thereby releasing the sinker from the bottom. Both type sinkers have been commercially available for many years. The newer type sinker is difficult to make because the rotating wires have to be placed into the sinker at the time of manufacture but has the advantage of requiring less force to release the sinker from the bottom and can easily be reused simply by rotating the wires back into their original position.

SUMMARY OF THE INVENTION

As disclosed herein, a bottom snagging sinker may be assembled by any person using any sinker having a hole through it. The rotating wires are in or captivated by a plastic nose cone that can be fitted to any after market sinker that has a hole through it. A kit comprising the nose cone, cotter pin, snagging wires and retaining ring are provided so a fisherman or other person can use weights that are already owned to construct what becomes a bottom snagging sinker with rotating wires that operates in the same manner as conventional rotating wire type bottom snagging sinkers.

BRIEF DESCRIPTION OF THE DRAWINGS

FIG. 3 is a top view of a bottom snagging sinker;

FIG. 4 is a cross-sectional view of the bottom snagging sinker of FIG. 3, taken substantially along line 4-4 thereof as viewed in the direction indicated by the arrows;

FIG. 5 is an exploded isometric view of the sinker of FIGS. 3-4;

FIG. 6 is an exploded side view of the sinker of FIGS. 3-4;

FIG. 7 is an enlarged exploded view of the nose cone and retaining ring, illustrating the nose cone rotated 90° relative to the showing of FIG. 6; and FIG. 8 is an enlarged isometric view of the retaining ring.

DETAILED DESCRIPTION OF THE INVENTION

Figure 1:
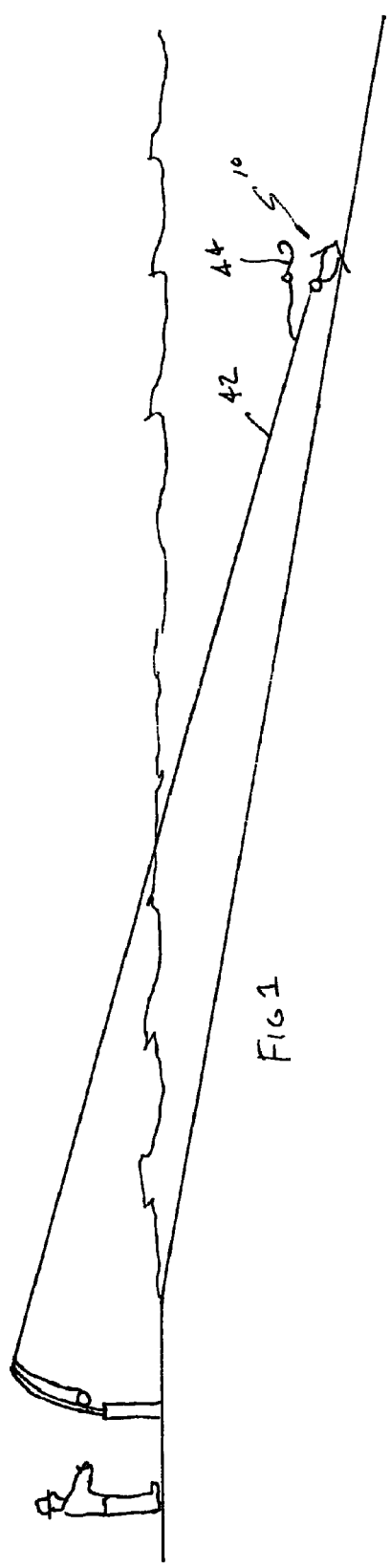
FIG. 1 is a pictorial view showing a bottom snagging sinker used to position a hook near the bottom of a body of water.
Figure 2:
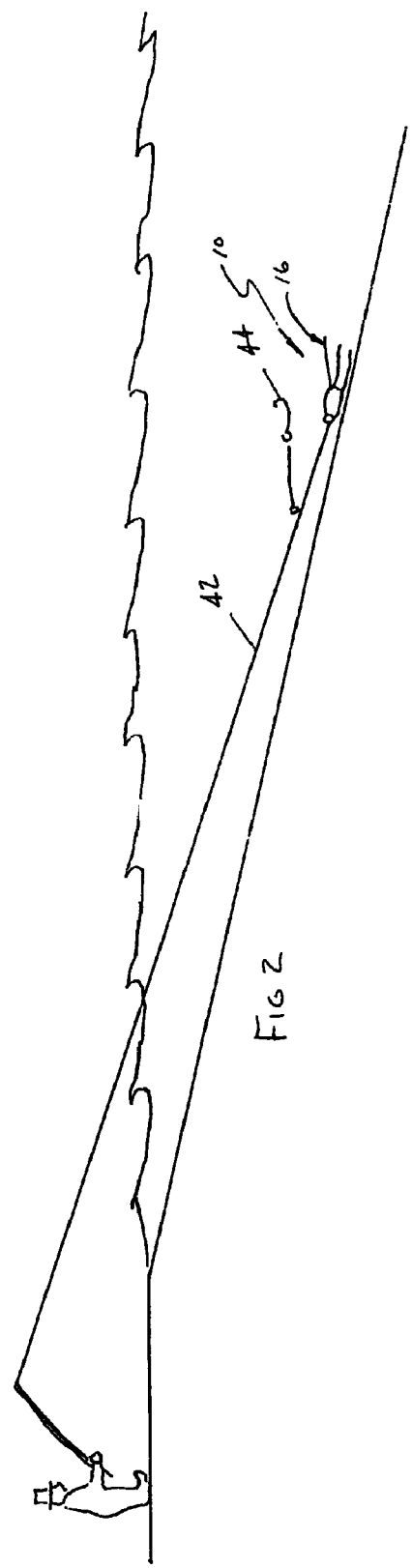
FIG. 2 is a pictorial view similar to FIG. 1 showing the sinker released from the bottom of the body of water.

Referring to FIGS. 1-9, a bottom snagging sinker 10 comprises a nose cone section 12, a retaining ring 14, two or more sets of rotating anchor wires 16 that are originally fixed in a bottom snagging position shown in FIGS. 1, 3, 5 and 6 and released for movement to the position shown in FIG. 2 so the sinker 10 can be readily retrieved.

The user provides a sinker weight 18 having a passage 20 therethrough through which a cotter pin 22 or other attachment device extends thereby attaching the weight 18 to the retaining ring 14.

The nose cone section 12 may preferably be made of plastic and has the function of receiving a straight section 24 of the anchor wires 16 and mounting them for rotation about an axis 26. The cone section 12 attaches to the retaining ring 14 in any suitable manner including adhesives or the like but preferably may be a snap fit where the retaining ring 14 includes a central opening 28 into which fingers 30 of the nose cone 12 snap. The fingers 30 are thus sufficiently resilient to allow connecting movement. FIG. 6 suggests there are only two fingers 30 while, in some embodiments, another set of fingers are immediately behind and obscured by those shown.

The retaining ring 14 includes a pair of grooves 32 where the section 24 of one of the wires 16 fits and a pair of ribs 34 providing an adjacent recess or notch receiving the section 24 of the other of the wires 16. A comparison of FIGS. 6 and 7 shows that the nose cone 12 provides a first pair of shallow aligned grooves 35 which, when the sinker 10 is assembled, align with the relatively deep grooves 32, A second pair of deeper grooves 37 are provided by the nose cone 12 to cooperate and align with the ribs 34 to captivate the upper anchor wire 16 between the nose cone 12 and the retaining ring 14. In other words, FIG. 7 does not suggest the assembled condition because the nose cone 12 may preferably be rotated 90° so the deep grooves in the nose cone 12 align with the ribs 34 on the retaining ring 14. The retaining ring 14 also includes a series of radially spaced grooves or notches 36 on the exterior so the wires 16 are held in place until a sufficient force is applied to the fishing line to cause the wire sections 24 to rotate about the axes 26.

As shown, there are two wires 16, so the straight section 24 of one of the wires 16 runs over the top of the other wire, as shown in FIG. 4. In other words, one of the wires 16 rests just above the other wire. In some embodiments, the wires 16 may preferably be stainless steel that rotate to release the sinker 10 from the bottom. The retaining ring 14 may be made of plastic or other suitable material and acts to connect the nose cone 12 to the weight 18. The cotter pin 22 may preferably be stainless steel and secures to the retaining ring 14 by bending or flaring the ends as shown in FIG. 4. The weight 18 is preferably provided by the fisherman or other person and is heavier than water. By providing a kit, the fisherman is able to assemble a bottom snagging sinker 10 that is compatible with the type fishing rig he intends to use, i.e. a heavy sinker is used with a heavy duty leader, hook and line while a light sinker is used with a light duty leader, hook and line. In this manner, a single kit may be used to make bottom snagging sinkers of wide capacity with no increase in inventory by the manufacturer, wholesaler or retailer.

The sinker 10 is assembled by placing the retaining ring 14 on top of the weight 18 so the upper end of the sinker weight 18 enters the passage 28 and then passing the cotter pin 22 through the passage 28 in the weight 18 and through the opening 10 in the retaining ring 14. The ends of the cotter pin 22 are then bent to capture the retaining ring 14 as shown in FIG. 4. A comparison of FIGS. 4 and 6 shows that the wires 16 are arranged at 90° with one of the sections 24 placed in the slots 32 and the section 24 of the other wire 16 is placed in the notch provided by the ribs 34. It will also be seen that the grooves 32 are sufficiently deep to receive the bent ends 38 of the cotter pin 22. The nose cone 12 is then attached to the retaining ring 14, as by pushing them together until the fingers 30 extend through the passage 28 and snap under the edge or shoulder 40 of the retaining ring 14.

In use, as shown in FIGS. 1 and 2, the sinker 10 is cast into the water so it sinks to the bottom. The wires 16, which initially extend toward the fishing line or leader 42, snag the bottom of the body of water and, in effect, make the end of the fishing line 42 more-or-less stationary. A baited hook or lure 44 is connected to the fishing line 42 in any suitable manner near the sinker 10 so it remains near the bottom of the water. When the fisherman decides to retrieve the sinker 10 and hook 44, he reels in some of the fishing line. This applies a force to the sinker 10 which causes the wires 16 to rotate about the axes 24 whereupon the wires 16 point away from the fishing line 42 as shown in FIG. 2. This releases the sinker 10 from the bottom and the fishing line may be reeled in.

The fishing line or leader 42 may connect to a loop 46 provided by the cotter pin 22 in a conventional manner. The wires 16 may be of conventional shape having outwardly convex legs 48 terminating in wire ends 50.

Rather than having the retaining ring 16 provide both the ribs 34, it will be apparent that the nose 12 may provide a groove to receive the upper anchor wire. It will also be apparent that the groove 32 and the ribs 34 may be provided on the nose 12, i.e. this being a reversal of the upper end of the retaining ring 14 and the lower end of the nose 12.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A bottom snagging sinker comprising
a sinker weight having a passage therethrough and providing a longitudinal sinker axis;
a retaining ring seated on one end of the sinker weight;
a first connector extending through the sinker weight passage and securing the retaining ring to the sinker weight;
a nose and at least one anchor wire having a straight central section transverse to the sinker axis and ends projecting away from the central section to provide the capability of snagging a bottom of a water body,
the nose, retaining ring and sinker weight comprising a sinker body with the nose at one end, the sinker weight at an opposite end and the retaining ring between the nose and sinker weight,
the anchor wire being captivated between the nose and the retaining ring and being pivotally mounted about a rotational axis perpendicular to the sinker axis and extending through the central anchor wire section, the anchor wire being pivoted between a first position where the ends overlie the sinker weight and a second position overlying the nose; and
a second connector securing the nose to the retaining ring.

2. The bottom snagging sinker of claim 1 wherein the first connector comprises a cotter pin having a pair of ends extending through the sinker weight passage and bent to secure the retaining ring to the sinker weight.

3. The bottom snagging sinker of claim 1 wherein the first connector provides a securement end attached to the retaining ring and a looped end, opposite the securement end, adapted to attach to a fishing line.

4. The bottom snagging sinker of claim 1 wherein the second connector comprises at least one resilient prong on one of the ring and nose and at least one shoulder on another of the ring and nose, the prong and shoulder engaging to prevent separation of the ring and nose.

5. The bottom snagging sinker of claim 4 wherein the prong is on the nose and the shoulder is on the ring.

6. The bottom snagging sinker of claim 1 wherein the retaining ring provides an opening therethrough exposing a downwardly facing annular shoulder and the nose provides a pair of oppositely facing resilient prongs, the prongs and shoulder engaging to prevent separation of the ring and nose.

7. The bottom snagging sinker of claim 1 wherein the anchor wire comprises a pair of outwardly convex wire ends projecting away from the straight central section and wherein the nose and retaining ring together provide a groove receiving the straight central section of the anchor wire.

8. The bottom snagging sinker of claim 1 wherein the anchor wire ends comprise outwardly convex wire ends projecting away from the central section and wherein the retaining ring provides at least one groove on an exterior thereof receiving part of the convex wire ends holding the anchor wire in a bottom snagging position.

9. The bottom snagging sinker of claim 8 wherein there are two anchor wires located perpendicularly to each other and the retaining ring provides four grooves, one for each of the convex wire ends.

10. The bottom snagging sinker of claim 9 wherein the central section of a first anchor wire overlies the central section of a second anchor wire.

11. The bottom snagging sinker of claim 1 wherein there are at least two anchor wires captivated between the nose and the retaining ring.

12. The bottom snagging sinker of claim 1 wherein the retaining ring comprises a retaining ring passage therethrough and the sinker weight comprises a forward tapered end extending into the retaining ring passage.

13. A kit for assembling a bottom snagging sinker incorporating a sinker weight having a passage therethrough and providing a longitudinal sinker axis, comprising
a retaining ring adapted to seat on one end of the sinker weight;
a first connector adapted to extend through the sinker weight passage and secure the retaining ring to the sinker weight;
a nose and at least one anchor wire having a straight central section adapted to be captivated between the nose and the retaining ring and ends projecting away from the central section to provide the capability of snagging a bottom of a water body,
the nose, retaining ring and sinker weight comprising a sinker body with the nose at one end and the sinker weight at an opposite end,
the anchor wire being adapted to pivot about a rotational axis perpendicular to the sinker axis, the rotational axis extending through the central section between the nose and the retaining ring to thereby release the sinker from the bottom; and
a second connector adapted to secure the nose to the retaining ring whereby the retaining ring is attached to the sinker weight by use of the first connector and the nose is attached to the retaining ring by the second connector to provide a bottom snagging sinker.

14. The bottom snagging sinker kit of claim 13 wherein the retaining ring provides a pair of aligned grooves adapted to receive the straight central section of a first of the anchor wires and the nose provides a pair of aligned ribs providing a pair of aligned notches adapted to receive the straight central section of a second of the anchor wires, the grooves and notches being radially offset to position the anchor wires at radially spaced locations and being offset in a linear direction along an axis perpendicular to the straight sections whereby a first of the anchor wires is spaced from a second of the anchor wires.

15. The bottom snagging sinker kit of claim 13 wherein the first connector comprises a cotter pin having a pair of ends adapted to extend through the sinker weight passage to secure the retaining ring to the sinker weight.

16. The bottom snagging sinker kit of claim 13 wherein the first connector provides a securement end and a looped end, opposite the securement end, adapted to attach to a fishing line.

17. The bottom snagging sinker kit of claim 13 wherein the second connector comprises at least one resilient prong on one of the ring and nose and at least one shoulder on another of the ring and nose, the prong and shoulder to prevent separation of the ring and nose.

18. The bottom snagging sinker kit of claim 13 wherein the retaining ring provides an opening therethrough exposing a downwardly facing annular shoulder and the nose provides a pair of oppositely facing resilient prongs, the prongs and shoulder adapted to engage to prevent separation of the ring and nose.

19. The bottom snagging sinker kit of claim 13 wherein the anchor wire comprises a pair of outwardly convex wire ends projecting away from the central section and wherein the nose and retaining ring together provide grooves adapted to receiving the central section of the anchor wires.

20. The bottom snagging sinker kit of claim 13 wherein the retaining ring provides a pair of aligned grooves adapted to receive the straight central section of a first anchor wire and a pair of ribs providing a pair of aligned notches adapted to receive the straight central section of a second anchor wire, the grooves and notches being offset radially and offset perpendicularly to the straight section of the anchor wires.

\* \* \* \* \*